United States Patent [19]

Ito et al.

[11] 4,187,454
[45] Feb. 5, 1980

[54] INDUSTRIAL ROBOT

[75] Inventors: Yoshimasa Ito, Yokohama; Junichi Ikeda, Tokyo, both of Japan

[73] Assignee: Tokico Ltd., Kawasaki, Japan

[21] Appl. No.: 901,841

[22] Filed: May 1, 1978

[30] Foreign Application Priority Data

Apr. 30, 1977 [JP] Japan .................................. 52-50105
Sep. 20, 1977 [JP] Japan .................................. 52-112996
Sep. 20, 1977 [JP] Japan .................................. 52-112997

[51] Int. Cl.$^2$ .......................................... G05B 19/42
[52] U.S. Cl. .................................... 318/568; 364/107
[58] Field of Search .................... 318/568; 364/107; 219/80

[56] References Cited

U.S. PATENT DOCUMENTS

| 3,970,831 | 7/1976 | Hegyi ................................ 318/568 |
| 4,011,437 | 3/1977 | Hohn ............................ 318/568 X |
| 4,086,522 | 9/1976 | Engelberger et al. ............... 318/568 |

*Primary Examiner*—B. Dobeck
*Attorney, Agent, or Firm*—Haseltine, Lake & Waters

[57] ABSTRACT

An industrial robot comprises a robot structure having a movable part, driving means for driving said movable part, detection means for detecting substantially a displacement of said movable part and for generating a position detection signal, memory means for memorizing the signal from said detection means and reading out the signal thus memorized, control means for controlling a memorizing operation and reading out operation of said memory means and for controlling said driving means responsive to the signal read out from the memory means, workpiece conveying means for conveying a workpiece through a space in which said movable part of said robot structure moves, allowing working to said workpiece at a predetermined working place, and workpiece detection means disposed near entrance to the working place in a conveying path of said conveying means, and adapted to detect the workpiece conveyed to the working place and thereby to send out a detection signal to said control means, said control means undergoing operation in response to the work detection signal supplied thereto.

4 Claims, 13 Drawing Figures

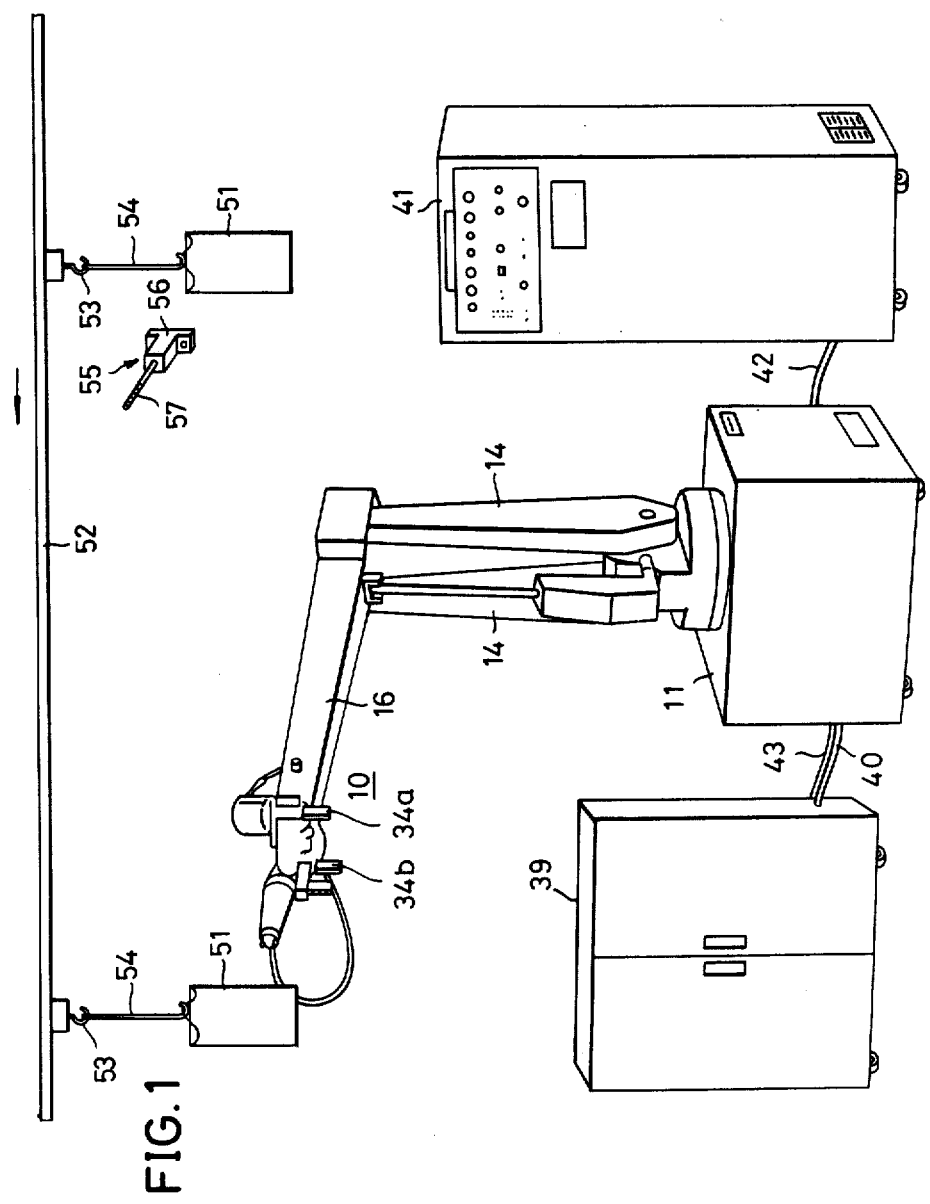

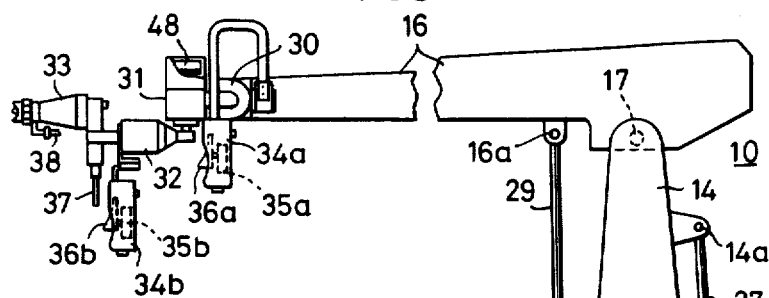
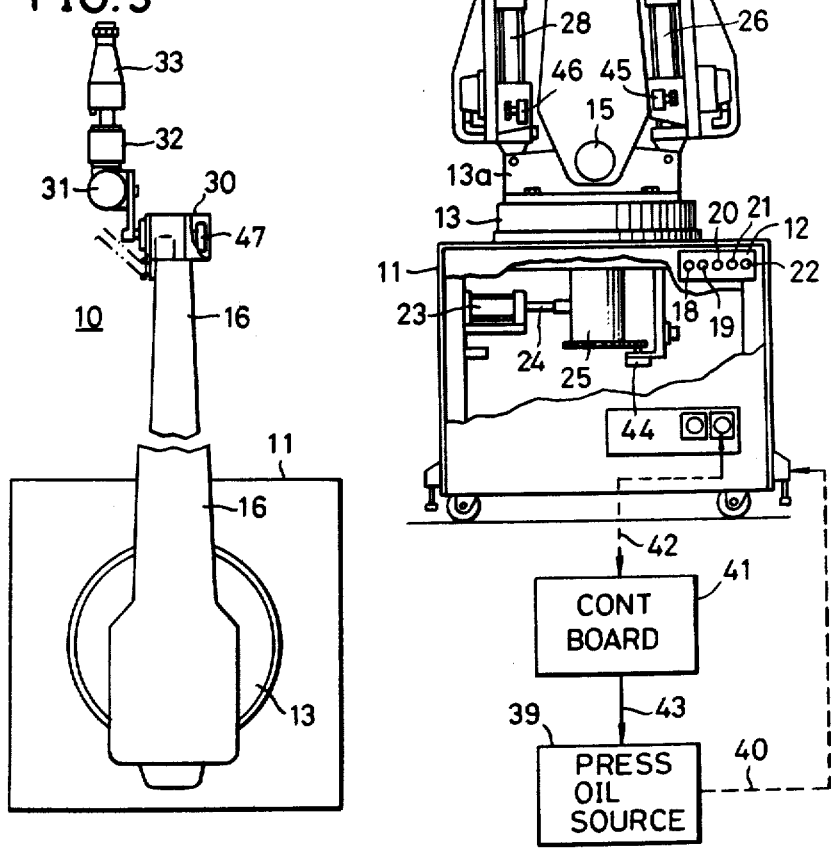

INDUSTRIAL ROBOT

BACKGROUND OF THE INVENTION

The present invention relates generally to industrial robots and more particularly to an industrial robot wherein, for workpieces which are transfered in succession by a conveyor system, operation or working is carried out in accordance with contents memorized in a memory apparatus.

In general, the playback type industrial robot is so adapted that the moving or displacing operation of a movable part may be memorized or taught in the memory apparatus by moving manually the movable part by an operator, and that, in a playback operation mode, the movable part operates or moves automatically in accordance with the memorized or taught contents. Accordingly, the playback type industrial robot is not necessitated to arrange a working program through the use of devices such as a pin-board. Therefore, the robot of this type has the advantage that the working contents can be easily and accurately memorized or preset.

In the case of applying industrial robots of this type to an apparatus for spray-painting a workpiece conveyed or transferred in succession along a conveyor line, for instance, an operator manipulates, in teaching mode, to move an arm of a robot structure in accordance with actual motion of the workpiece and to spray paint by means of a spray gun provided at a distal end of the arm onto the workpiece. The motion of the arm is detected by an arm position detection means, and then memorized in a memory apparatus in a control board unit.

The industrial robot known heretofore is adapted so that, whereupon a teaching operator closes a switch on the arm at a time instant when he judges that the workpiece reaches a predetermined operating place, the memory apparatus turns to a state of capable of memorizing, and whereby the motion of arm hereinafter is memorized. In a case where the speed of the conveyor line changes due to voltage fluctuation and the like, there occur an instance wherein playback operation is not carried out at a position, with respect to the workpiece, where the teaching operation is conducted by the operator. Accordingly, the time instant of initiating playback operation is sometimes deviated from the time instant of initiating teaching operation, which results in difficulty that uneveness of painting takes place in the workpiece.

This difficulty may be eliminated by providing a delay circuit in a control board unit, for example. The delay circuit causes the signal from the detection switch to delay by a specific period of time so that the starting timing of play-back operation comes to coincide with that of teaching. This arrangement, however, involves difficulties such that setting of delay time in the delay circuit must be carried out in a try-and-error manner, and that adjustment of delay time is required every time when the conveying speed of the conveyor line is changed. This change of conveying speed must be made, for instance, when the working advancing degree in the following process is taken into consideration.

Moreover, the industrial robot of the above described structure is generally arranged, in view of the fact that conveying speed of the conveyor sometimes changes depending on working speeds at process stages preceding to and succeeding to the painting process, for instance, so that the operation speed of the robot structure can be variably changed by manipulating an adjusting knob, such as a volume knob, provided on the control board unit. This industrial robot is, however, accompanied with difficulties such that the operation speed of the robot structure, which is adjusted by the operator, is hardly synchronized with the conveying speed of the conveyor line, and that, even if the operation speed is adjusted accurately, any deviation in speed of the conveyor line due to change in workpiece weight may sometimes result in that the robot structure operates for the imaginary workpiece, not for the actual workpiece to which the spray-painting should be applied.

There have been instances wherein a plurality of different types of workpieces with different shapes and sizes is spray-painted through the use of the same industrial robot. A program presetting device of pin-board type is often employed in such cases, and arrangement of pins on the board is required to change in accordance with kinds of workpieces. Accordingly, particularly in a case such as that where a number of kinds of workpieces is large and a number of workpieces is large and a number of workpieces of the same type is small, or where the conveying speed of the conveyor line is relatively high, there arise difficulties that manipulation of changing arrangement of pin becomes much troublesome.

SUMMARY OF THE INVENTION

Accordingly, it is a general object of the present invention to provide a novel and useful playback type industrial robot in which the above described difficulties have been overcome.

Another object of the invention is to provide an industrial robot wherein unevenness of spray painting and erroneous welding (in the case of welding robot) in the playback mode can be eliminated. For achieving this, a workpiece detection switch is disposed hear the conveyor line and is operated, both in the teaching mode and in the playback mode, so that the starting time point of memorizing coincides with the starting time point of reading out from the memory apparatus. Accordingly, any deviation of timing of initiating operation of the robot structure in the teaching and playback modes, thus, can be eliminated without circuits, such as delay circuit.

Another object of the invention is to provide an industrial robot wherein the operation speed thereof is rendered in accurate synchronism with the conveying speed of the conveyor line, whereby operation or working is carried out positively to the workpiece all the time even if the conveying speed undergoes change. For achieving this, the conveying speed of the conveyor line is detected, a conveying speed signal thus detected is used as a sampling clock pulse and a recovery clock pulse in the teaching and playback modes respectively.

Still another object of the invention is to provide an industrial robot wherein operation or working for plural kinds of workpieces is carried out, with ease, by a single robot structure. For achieving this, there is arranged so that a plurality of programs corresponding to operation contents has been memorized in the memory apparatus of the robot structure, and program selection means connected to the robot structure selects a required program among the programs which have been memorized.

Other objects and features of the present invention will be apparent from the following description set forth in conjunction with the accompanying drawings.

BRIEF DESCRIPTION OF THE DRAWINGS

In the drawings:

FIG. 1 is a perspective view showing one embodiment of the playback type industrial robot according to the present invention;

FIG. 2 is an elevation, with a part cut away, showing a robot structure shown in FIG. 1;

FIG. 3 is a plan view of the robot structure of FIG. 2;

DETAILED DESCRIPTION

Figure 4:
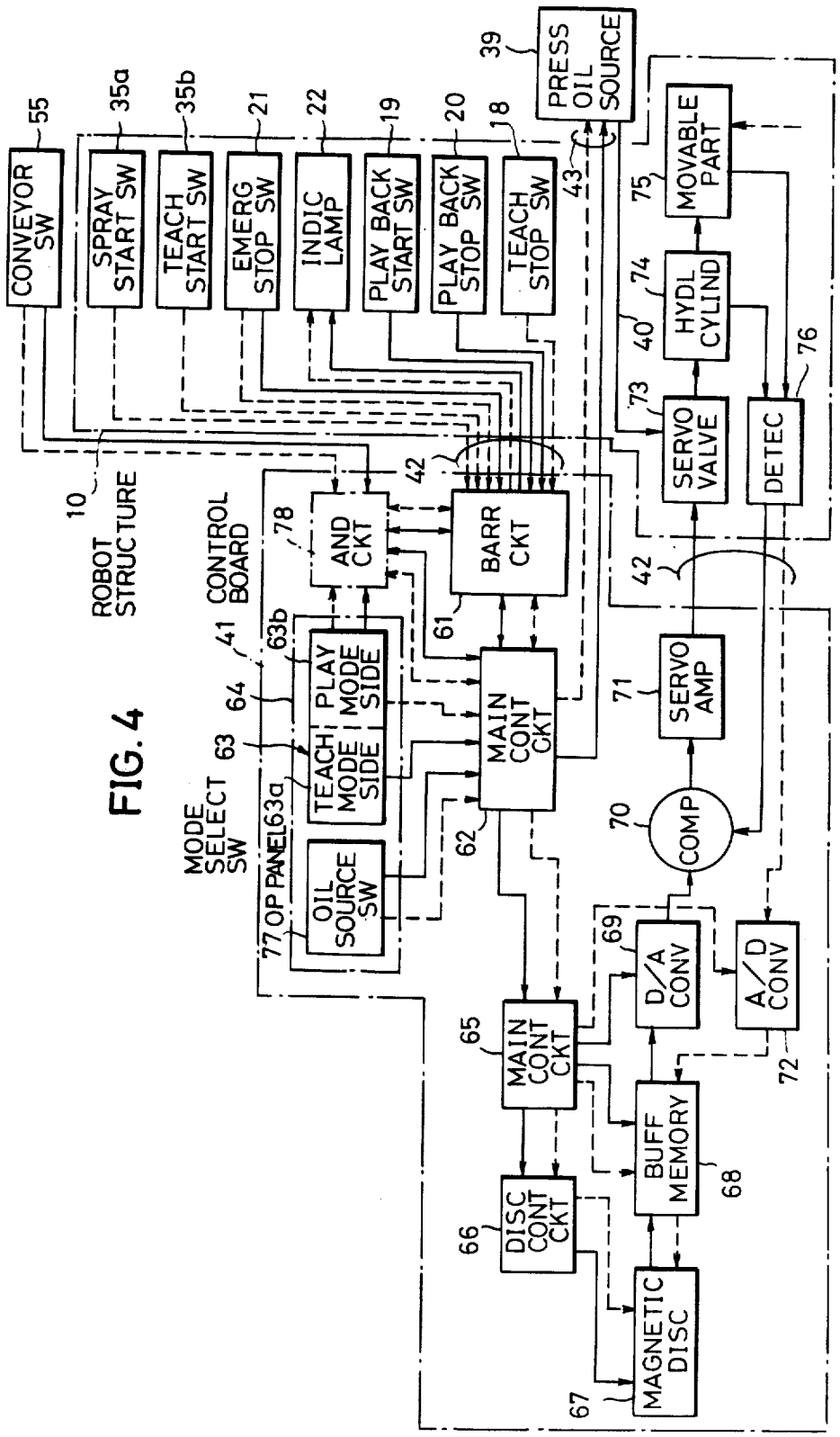
FIG. 4 is a block schematic diagram of an operation control system for controlling the robot structure shown in FIG. 2.

Referring to FIG. 1 through FIG. 3, one embodiment of a robot structure of a playback type industrial robot according to the present invention is described. A robot structure 10 is used for painting by spraying paint, in this embodiment.

A platform 11 is provided with a manipulation switch-panel 12 at a predetermined position, and a turntable 13 rotatably on the upper surface thereof. A post body 14 is supported its lower end by a shaft 15 in a swingable manner on a movable table 13a mounted unitarily on the turntable 13. At the upper end of the post body 14, an arm 16 is swingably supported by a shaft 17. In the drawings, the arm 16 is shown with a part cut out.

The switch-panel 12 is provided with manipulation switches comprising a teaching stop switch 18, a playback start switch 19, a playback stop switch 20 and an emergency stop switch 21, and an indication lamp 22.

A cylinder 23 is provided in the interior of the platform 11, and a rod 24 thereof is engaged with a part of the peripheral surface of a rotary shaft 25 fixed to the turn-table 13. The sliding movement of the rod 24 caused by the cylinder 23 imparts a force to the rotary shaft 25 in the tangent direction thereof, whereby the turntable 13 is rotated unitarily with the rotary shaft 25 in a horizontal plane over a predetemined angular range. A cylinder 26 in hinged, its lower end, to the movable table 13a, and a rod 27 of the cylinder 26 is also hinged, at the upper end thereof, to a bar 14a fixed to the post body 14. The sliding movement of the rod 27 causes the post body 14 to swing to the left and right within a predetermined angular range. A cylinder 28 is hinged, its lower end, to the table 13a, and a rod 29 of the cylinder 28 is also hinged, at the upper end thereof, to a bar 16a fixed to the lower surface of the arm 16. The sliding movement of the rod 29 causes the arm 16 to swing up and down within a predetermined angular range.

Hydraulic rotary actuators 30 and 31 and an air rotary actuator 32 are provided at the distal end of the arm 16. Further, a spray gun 33 for painting is mounted at the distal end of the actuator 32. A right-grip 34a and a left-grip 34b are respectively fixed to the distal end of the arm 16 and the air rotary actuator 32. The right-grip 34a incorporates therewithin a push-button 36a for closing a switch 35a, which is adapted to open and close the spray gun 33. The left-grip 34b incorporates therewithin a push-button 36b for closing the teaching switch 35a. The spray gun 33 is supplied with paints through a pipe 37 and air through a pipe 38.

The hydraulic cylinders 23, 26, and 28, and the hydraulic rotary actuators 30 and 31 are actuated by pressurized oil supplied through a supply pipe 40 from a pressurized oil supply source 39. Respective switches 18 through 21, and the indication lamp 22 on the switch panel 12, and the switch 35 are electrically connected through an electric wire 42 to a circuit in a control board 41 disposed at a position aparting from the platform 11. The pressurized oil supply source 39 is electrically connected to the control board 41 through an electric wire 43.

The switch-panel 12 is disposed on the platform 11, which is at a position outside of the rotating and swinging angular range of the movable parts such as the post body 14 and the arm 16, but may be provided on the control board 41.

Potentiometers 44 through 48 are respectively adapted to detect moving displacement of the hydraulic cylinders 23, 26, and 28, and the actuators 30 and 31, as changes in voltage.

The workpieces 51 to be spray-painted by the robot structure 10 is conveyed in the direction indicated by arrow in FIG. 1 by an overhead type chain conveyor 52, in the present embodiment. The chain conveyor 52 is provided witnh hooks 53 arranged with separation by a constant distance. The workpieces 51 are hanged on hangers 54 suspended from the hooks 53.

A detection switch 55 is mounted to a mounting member 56 which is disposed at an entrance of working place or position of the workpieces 51. An actuator rod 57 of the switch 55 projects into a path through which the hangers 54 are conveyed, and the switch 55 is closed when each hanger 54 comes to abut against the actuator 57 and pushes it aside.

The systematic diagram of the control system for actuating the robot structure 10 of the above described construction is described with reference to FIG. 4. In FIG. 4, the parts which are the same as those in FIG. 1 are designated by the like reference numerals and the description thereof is not repeated. In FIG. 4, a dotted arrow line and a full arrow line represent respectively the flow of signals at the time of a teaching operation mode and at the time of playback operation mode.

Respective switches 18 through 21 and the indication lamp 22 on the switch-panel 12, the switch 35a in the right-grip 34a, and the switch 35b in the left-grip 34b are connected to a first main control circuit 62 by way of a barrier circuit 61 in the control board 41. The barrier circuit 61 is of a well-known essentially safety explosion proof circuit. The barrier circuit 61 comprises relay coils and relay contacts shielded by insulating plates resistors, and the like. A current supplied to the relay coil and respective switch circuits of the switch panel 12 is restricted to such a small value that the explosion does not occur due to a spark developed by a short of lines of the switch circuits. The control board 41 contains therein an operation panel 64 having a pressurized oil source operation switch 77 and a mode-selecting switch 63 for selection a teaching mode side 63a or a playback mode side 63b, a second main control circuit 65, a disc control circuit 66, a magnetic disc 67, a buffer memory 68, a digital to analog (D/A) converter 69, a comparator 70, a servo amplifier 71, an analog to digital (A/D) converter 72, and an AND circuit 78, in addition to the above described barrier circuit 61 and the main control circuit 62.

In the robot structure 10, there are provide a servo valve 73, a hydraulic cylinder 74, a movable part 75, a position detector 76. The hydraulic cylinder 74 is indicated as a representative of the cylinders 23, 26, and 28, and the actuators 30 and 31. The movable part 75 is indicated as a representative of parts which are caused to be moved by the hydraulic cylinder 74. The position detector 76 is indicated as a representative of potentiometers 44 through 48 in FIG. 2 which are provided in associated with the above described hydraulic cylinder 74 and movable part 75 and detect moving displacements thereof as changes in voltage.

Figure 5:
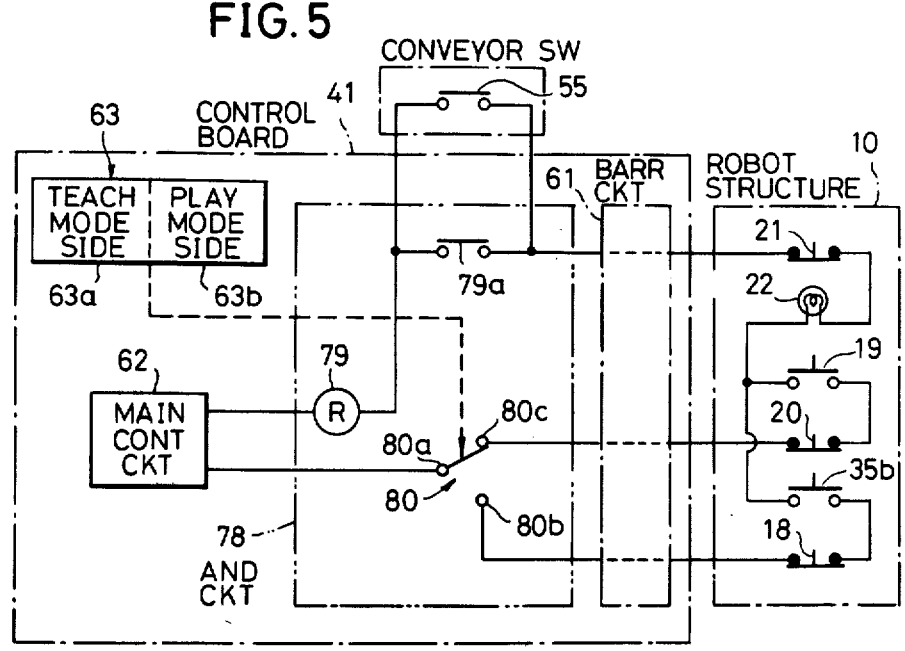
FIG. 5 is a circuit diagram of an AND circuit in FIG. 4.

The AND circuit 78 includes a relay 79, as indicated in FIG. 5. A detection switch 55 is connected in parallel with a self-held contact 79a of this relay 79. The AND circuit 78 further includes a changeover switch 80, which is changed over by manipulation of the mode selection switch 63. For example, when the mode selection switch 63 is switched to the teaching mode 63a, the contact 80a is connected to the contacts 80b, and when the mode selection switch 63 is changed over to the playback mode side 63b, the contacts 80a and 80c are connected.

The emergency stop switch 21 and the indication lamp 22 in the robot structure 10 are connected in series with the contact 79a of the relay 79. Between these series connection circuit and the changeover switch 80, is connected a series connection circuit comprising the playback start switch 19 and playback stop switch 20. Furthermore, between the above series connection circuit and the contact 80b of the changeover switch 80, is connected a series connection circuit comprising the teaching switch 35b and the teaching stop switch 18.

Figure 6:
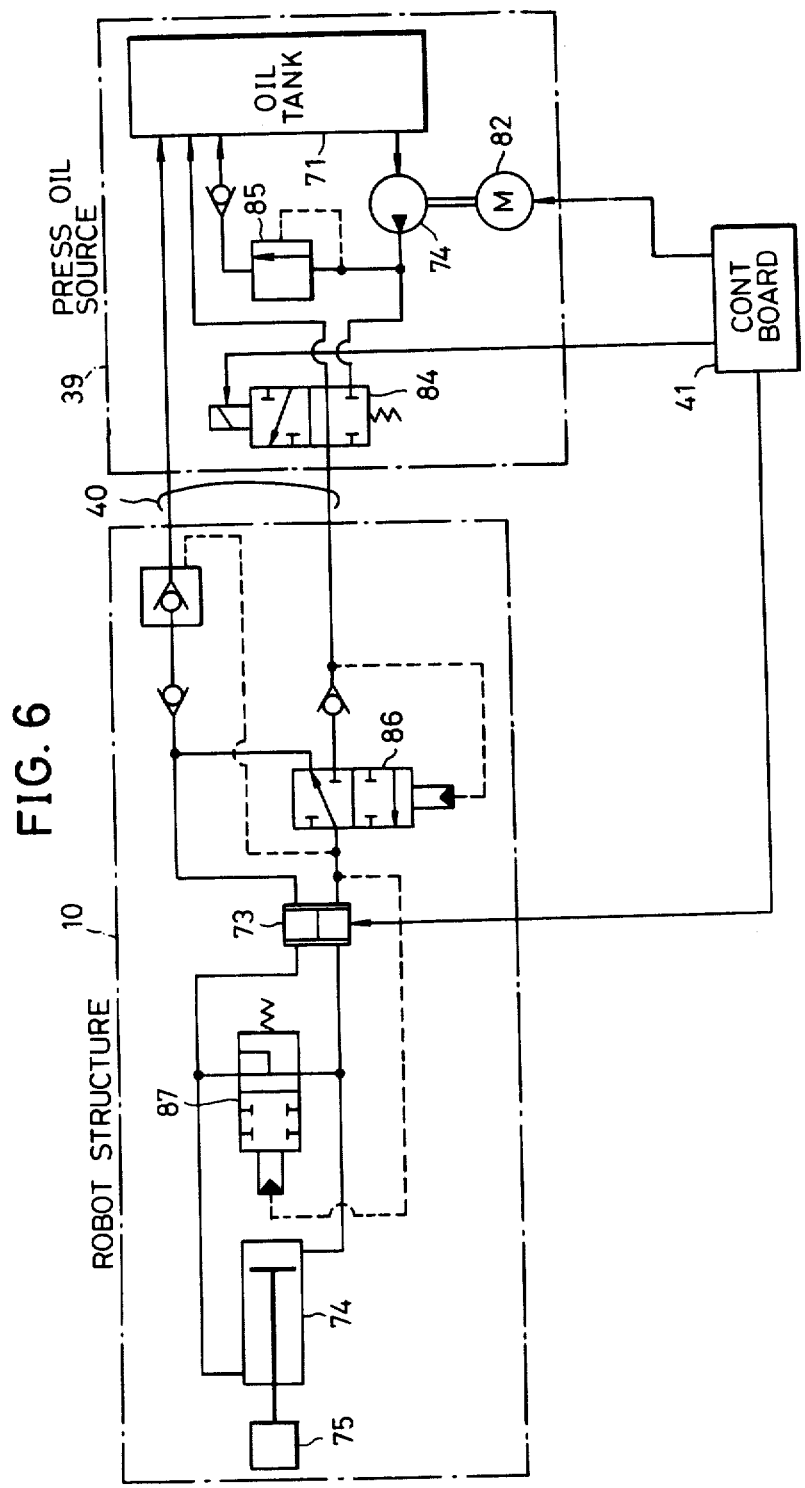
FIG. 6 is a schematic diagram showing a part of a hydraulic system shown in FIG. 4.

A schematic diagram of the hydraulic system is shown in FIG. 6. The pressurized oil supply source 39 comprises an oil tank 81, a pump 83 driven by a motor 82, a solenoid valve 84, a relief valve 85, and the like. The hydraulic system in the robot structure 10 is communicatively connected to the pressurized oil supply source 39 through the pipe 40, and comprises pilot changeover valves 86 and 87, a servo valve 73, a hydraulic cylinder 74, and the like. At appropriate positions along the pipe line, check valves are provided in accordance with the necessity.

The teaching operation and playback operation are successively described with reference to FIG. 1 through FIG. 6.

First, preceding to the starting of operation, a pressurized oil supply source operation switch 77 on the operation panel 64 of the control board 41 is rendered "ON." As a result, the main control circuit 62 operate to assume the state wherein the power source is to be supplied to the motor 82 in the pressurized oil supply source 39, whereby the pump 83 is driven to send out oil in its pressurized state from the oil tank 81.

For carrying out the teaching, the mode-selecting switch 63 on the operation panel 64 is switched to the teaching mode side 63a. Accordingly, the switch 80 in the AND circuit 78 is changed over thereby to connect contacts 80a and 80b thereof.

Then, a new workpiece 51 to be spray-painted is suspended from the hanger 54, and therefter, the chain conveyor 1 is driven thereby to convey the workpiece 51 in the arrow direction.

When the workpiece 51 approaches the working position, a teaching operator holds the grips 43a and 34b with his right hand and left hand respectively and depresses the single push-bottom 36b, thereby rendering the teaching switch 35b into "ON."

As a result of it, the solenoid valve 84 in the pressurized oil supply source 39 is closed in response to a signal sent out from the main control circuit 62, whereby the pressurized oil from the pump 83 is prevented from supplying to the robot structure 10 and is therefor relieved through the relief valve 85 into the oil tank 81. The pilot changeover valve 87 provided in the interior of the robot structure 10 serves to communicatively connect two chambers defined by a piston in the hydraulic cylinder 74. The hydraulic cylinder 74 is not supplied with the pressurized oil, but assumes a state where the piston and rod can be moved freely without any load or resistance.

However, when the operator operates to close the teaching switch 35b, the workpiece 51 does not reach the working position yet, whereby the detection switch 55 is not closed yet. Accordingly, the AND circuit 78 is not in an operative state, and, even if the operator moves the movable part 75, the motion of the movable part 75 is not memorized on the magnetic disc 67.

When the workpiece 51 is conveyed to the working position, the hanger 54 abuts against the actuator 57 of the detection switch 55. As the workpiece 51 is conveyed, the actuator 57 is put aside, and the detection switch 55 is thereupon closed. As a result of it, coincidence between the detection switch 55 and the teaching switch 35b is now established, whereby the relay 79 is supplied with current thereby being energized. After the detection switch 55 is opened, the relay 79 is held in its energized state by the closed contact 79a.

Whereupon the relay 79 is energized, the signal is supplied from the AND circuit 78 to the main control circuit 62, and the indication lamp 22 thus turns on. Moreover, in response to the main control signal from the main control circuit 62, a writing in (recording) instruction is supplied from the disc control circuit 66 to the magnetic disc 67.

Then, the teaching operator manipulatively moves the movable part 75, with holding the grips 34a and 34b, and depresses the push-botton 36a appropriately for spraying paint from the spray gun 33. The position detector 76 produces the signal corresponding to the displacement of the movable part 75. The produced signal is supplied to the A/D converter 72 provided in the control board 41 and converted thereat from the analog signal to the digital signal. In response to a main control signal from the main control circuit 65 which has been received with the signal from the main control circuit 62, the A/D converter 72 sends out the output digital signal to the buffer memory 68. The buffer memory 68 is controlled by a signal from the main control circuit 65, and operates, during the teaching operation, to store temporarily the signals from the A/D converter 72.

Signals sent out from the buffer memory 68 are recorded and memorized on the magnetic disc 67. The magnetic disc 67 is controlled by signals from the disc control circuit 66 and thereby performs its writing in (recording) operation.

Here, since the operation speed of the position detector 76 and the memorizing speed of the magnetic disc 67 differ greatly with each other, the buffer memory 68 is provided for the purpose of storing or accumulating the signals temporarily.

According to the operation set forth, the movement path of the movable part 75 which has been moved manually by the teaching operator is totally memorized on the magnetic disc 67. The information as to the timing for opening valve of the spray gun 33 is also recorded in the magnetic disc 27, similarly as in the preceding case. After the teaching operation is carried out correctly and is completed, the teaching stop switch 18 is manipulated thereby to record an end mark signal at the end of recording on the magnetic disc 67. Simultaneously, the relay 79 in the AND circuit 78 is deenergized, and the indication lamp 22 is thereby turned off.

For playing back the operation which has been taught and memorized as described hereinbefore, the mode selection switch 63 on the manipulation panel 64 is set to the playback mode side 63b, and the playback start switch 19 is closed. As a result of this manipulation, the switch 80 in the AND circuit 78 is changed over, and connection is thereby made between the contacts 80a and 80b. Moreover, the main control circuit 62 emitts a signal responsive to the switching of the switch 63 to the solenoid valve 84 in the pressurized oil supply source 39. The solenoid valve 84 is then opened to supply the pressurized oil from the pump 83 to the hydraulic cylinder 74 through the servo valve 73 in the robot structure 10.

Here, until the workpiece 51 to be spray-painted reaches the working position, the detection switch 55 is remained in its opened state. Therefore, the read out starting signal is not supplied whatsoever from the disc control circuit 66 to the magnetic disc 67, and the robot structure 10 is in its ready state.

When the workpiece 51 is conveyed to the working position and the detection switch 55 is closed, the AND circuit 78 initiates to supply the signal to the main control circuit 62. Thus, the robot structure 10 performs playback operation in accordance with the memory contents memorized in the magnetic disc 67, as described hereinafter.

Accordingly, the robot structure 10 initiates its operation from a time point, as a starting time point, when the workpiece 51 reaches the predetermined working position. This operation starting time point, thus, accurately coincides with the teaching starting time point.

The signal of the main control circuit 62 is supplied to the main control circuit 65. The disc control circuit 66, in response to the signals from the main control circuit 65, sends out the signal to the magnetic disc 67 thereby causing it to perform the reading out (reproducing) operation. The signal read out from the magnetic disc 67 is supplied to the buffer memory 68, which is controlled by the signal of the main control circuit 65, and is stored or accumulated temporarily thereat.

The digital signal read out successively from the buffer memory 68 is supplied to the D/A converter 69, which is operated by the signal from the main control circuit 65, and is converted to the analog signal thereat. This output analog signal, a position signal of the movable part 75, is supplied to the comparator 70, where it is compared with the signal from the position detector 76. The output error signal of the comparator 70 is amplified by the servo amplifier 71, and is then applied to the servo valve 73 to control it. The servo valve 73 operates to control the flow and quantity of the pressurized oil to be supplied to the hydraulic cylinder 74 in accordance with the signal thus applied.

The movements of the hydraulic cylinder 74 and the movable part 75 are always fed back to the comparator 70 by the position detector 76, whereby the hydraulic cylinder 74 always operates in correspondence to the signal read out from the magnetic disc 67. Consequently, the movable part 75 moves automatically along the taught movement.

Figure 7:
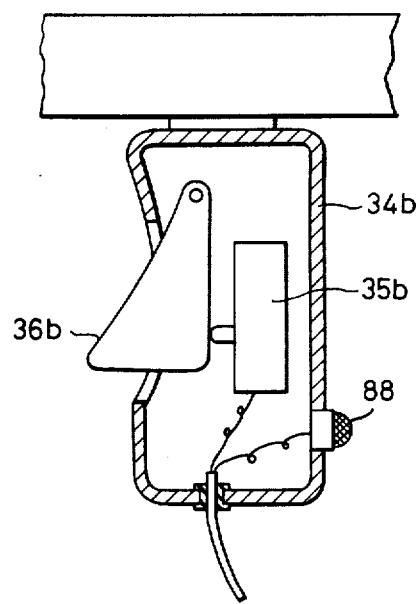
FIG. 7 is an elevation, in section, showing a modification of a teaching switch part.

Moreover, the above described embodiment may be modified in a manner such that a pilot lamp 88 is fitted to the left grip 34b, and the workpiece detection switch 35 is connected in series with the pilot lamp 88, as illustrated in FIG. 7. According to this modification, upon teaching, the operator, being at a posture of grasping the grip 34b to depress the push-botton 36b, can confirm the workpiece 55 to reach the working position, with the help of the pilot lamp 88 illuminated. For this reason, the teaching operation can be carried out more with ease.

Furthermore, in the above described embodiments, the AND circuit 78 may be of organization of logic circuit using transistors, integrated circuits (IC), and the like.

Next, another embodiment of the industrial robot according to the present invention, wherein the robot is adapted to operate in correspondence with the conveying speed of the conveyor, will be described in conjunction with FIG. 8 through FIG. 10. In FIG. 10, parts which are the same as corresponding parts in FIG. 4 are designated by like reference numerals, and the detailed description thereof is omitted.

Figure 8:
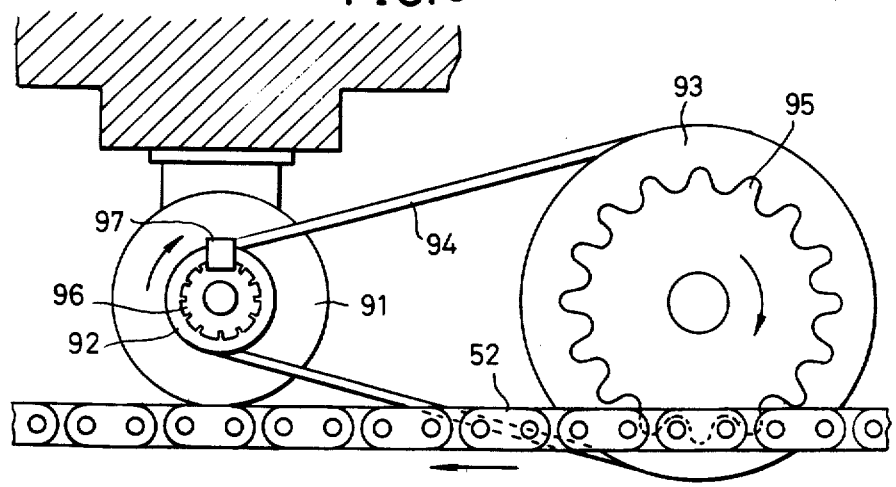
FIG. 8 is an elevation, in an enlarged scale, showing one embodiment of a conveyor driving device.

The chain conveyor 52 is driven to run by a sprocket 95 in the direction indicated by arrow in FIG. 8. The sprocket 95 is fixed to the belt wheel 93 and is driven by a motor 91 mounted on the ceiling, by way of a belt wheel 92 fixed to a motor shaft, a belt 94, and the driven belt wheel 93.

Figure 9:
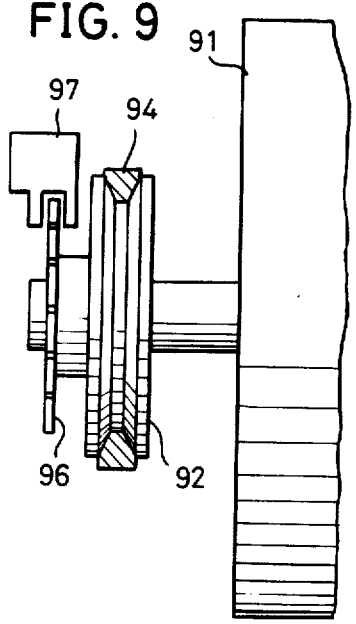
FIG. 9 is a side view showing a photo-coupler provided cooperatively in the device shown in FIG. 8.
Figure 10:
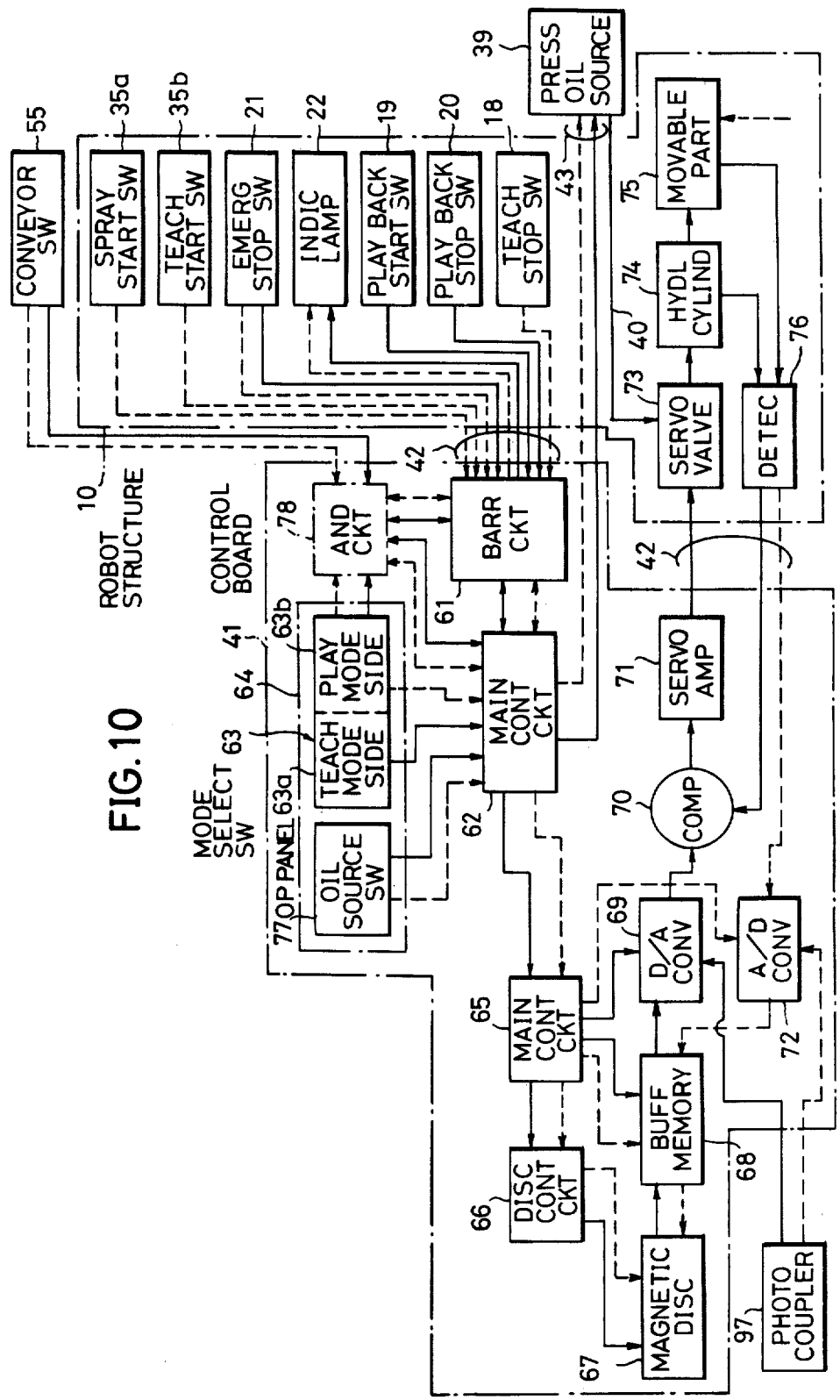
FIG. 10 is a block schematic diagram of an operation control system of an industrial robot provided with the conveyer driving device shown in FIG. 10.

To the belt wheel 92, there is coaxially fixed a slit disc 96 which is formed at its periphery with a number of equally spaced slits, as indicated in FIG. 9. A photo-coupler 97 of approximately U-shape is fitted, with their leg parts respectively confronting the opposite faces of the disc 96. The photo-coupler 97 outputs the pulse signals in proportion to a rotating speed of the slit disc 96, that is, a conveying speed of the conveyor 52. The photo-coupler 97 is connected to the A/D converter 72 and the D/A converter 69 on the control board 41. The pulse signals send out from the photo-coupler 97 are used as sampling clock signals in the teaching mode, and as recovery clock signals in the playback mode.

Specifically, in the teaching mode, the A/D converter 72 operates to sample the position detection signals from the position detector 76, in accordance with the sampling clock signals from the photo-coupler 97, and to convert the signals thus sampled to the digital signals. The magnetic disc 67 initiates to memorized from the time point when the workpiece 51 reaches the working position, that is, the position where the detection switch 55 operates, as described hereinbefore. The program to be memorized in the magnetic disc 67 is supplied, in response the sampling pulses in synchronism with the conveying speed of the workpiece 51, from the A/D converter 72 to the buffer memory 68. Accordingly, the program as to operation of the robot structure 10 is memorized in the magnetic disc 67, in relation with the conveying position of the workpiece 51.

Moreover, in the playback mode, the D/A converter 69 operates to convert the position signals stored or accumulated temporarily at the buffer memory 68 to the analog signals, in accordance with the recovery clock signal from the photo-coupler 97.

The magnetic disc 67 initiates to read out the programs from the time point when the workpiece 51 reaches the working position, and the programs thus read out are sent to the buffer memory 68. The position signals supplied to the comparator 70 are based on the recovery clock signals in synchronism with the conveying speed of the workpiece 51. In a consequence, the robot structure 10 carries out the spray-painting operation which has been taught, in relation with the positions of the workpieces 51.

Here, since the robot structure 10 carries out operation in synchronism with conveyance of the workpiece, the spray-painting on the workpiece 51 is carried out positively, wholly independent of factors, such as the conveying speed of the conveyor 52.

Moreover, as means for detecting conveying speed of the conveyer, a miniature generator, for example, may be used instead of the photo-coupler 97. In this modification, the voltage generated by the generator is supplied, as a speed detection signal, to the main control circuit 62, and the clock pulses generated in the main control circuit 62 are used as sampling clock signal and recovery clock signal corresponding to the conveying speed of the conveyor 52. According to this modification, the pulse intervals of the clock signals may be set at desired intervals.

Figure 12:
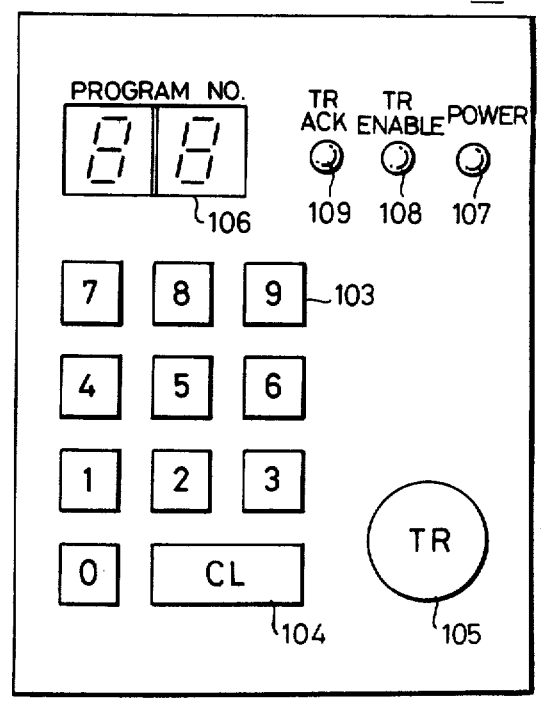
FIG. 12 is a plan view showing a board of the program selection apparatus shown in FIG. 11.
Figure 11:
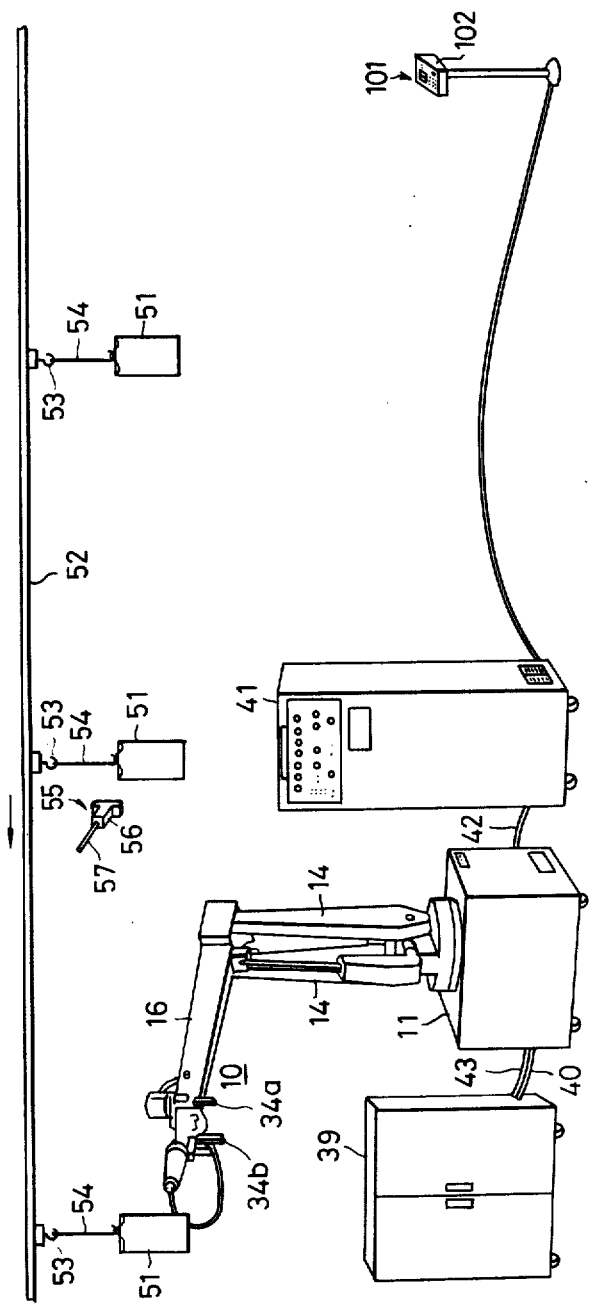
FIG. 11 is a perspective view showing one embodiment of an industrial robot provided with a program selection apparatus.
Figure 13:
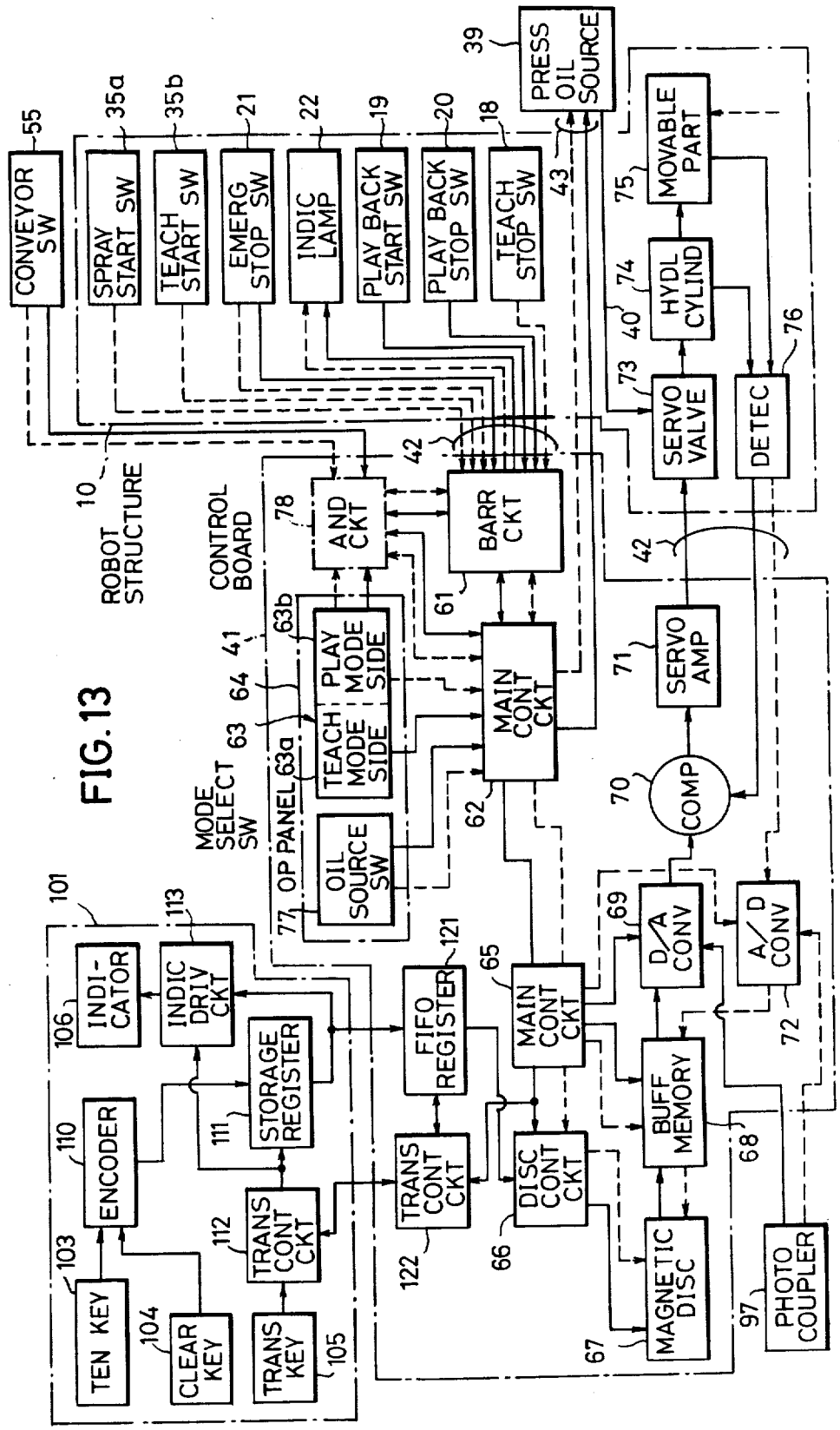
FIG. 13 is a block schematic diagram of an operation control system of an industrial robot shown in FIG. 11.

Next, another embodiment of the present invention wherein a program selection apparatus is cooperatively provided to the industrial robot is described in reference to FIG. 11 through FIG. 13. In FIG. 13, the parts corresponding to those in FIG. 10 are designated by like reference numerals, and the description thereof is omitted.

In the present embodiment, a plurality of programs given by a number is recorded in the magnetic disc 67 of the control board 41. These programs respectively correspond to the kinds of workpiece 51. Through manipulating keys on a key board post 101, a specific program can be read out among plural programs memorized. The key board post 101 is stationed near the operator for suspending workpiece, who is far aparted from the control board 41.

On a board 102 of the key board post 101, there are arranged ten-key 103, a clear key 104, a transfer key 105, a program number indicator 106, a power source lamp 107, a transfer enable indication lamp 108, a transfer acknowledgement lamp 109, and the like.

Further, inside of the key board post 101, there are provided an encoder 110, a storage register 111, a transfer control circuit 112, an indicator drive circuit 113, and the like. A FIFO (first in first out) register 121 and a transfer control circuit 122 are further provided in the control board 41. The teaching contents for various workpieces 51 have been memorized in the magnetic disc 67, as a plurality of programs given by a number corresponding to the kinds of workpiece 51.

Upon spray-painting, when the operator know beforehand spray-painting order, he manipulates ten-key 103 of "0" through "9" on the key board post 101 in accordance with said order, thereby introducing a required programs. Alternatively, in the case where the operator does not know the painting order, he manipulates the ten-key 103 whenever reading out the number marked on the workpieces 51 being conveyed by the conveyor 52, in general, whenever operating to hang the workpiece 51 on the hanger 54.

In the case of spray-painting the workpiece 51 of number "k," for example, the operator manipulates the ten-key 103 to address the number "k." The number "k" first be converted to a binary-coded signal in the encoder 110. The number "k" thus binary-coded is led to the storage register 111, which then outputs the signal to the indicator drive circuit 113. Thus, the circuit 113 is operated, whereby the above selected number "k" is now indicated on the indicator 106.

Then, the operator confirms the number indicated in the indicator 106 to be correct, and thereafter, depresses the transfer key 105 on condition that the transfer enable indication lamp 108 is illuminating. When the ten-key 103 is erroneously manipulated, the number indicated is cleared by the clear key 104. Moreover, when the lamp 108 is not illuminating, the operator waits until the lamp 108 is turned on and then depresses the key 105 after the lamp 108 is turned on.

As a result of depressing of the transfer key 105, the transfer control circuit 112 is operated thereby to send the transfer order to the storage register 111. The transfer order is one for selectively transferring the binary-coded number "k" stored in the storage register 111 to the FIFO register 121 in the control board 41. Simultaneously with it, the transfer control circuit 112 outputs a signal, indicating initiation of transfer, to the transfer control circuit 122 in the control board 41.

The number "k" transferred from the storage register 111 to the FIFO register 121 is registered therein. When the workpiece 51 is detected by the detection switch 55, the disc control circuit 66 is operated by the signal led out from the FIFO register 121, and the program of the program number "k" is thereby read out from the magnetic disc 67.

Whereupon the transfer of a single number to the FIFO register 121 terminates, the transfer acknowledgement indication lamp 109 is turned on for a very short time period (for example, one second), and immediately thereafter, the transfer enable indication lamp 108 is turned on, in response to the order from the transfer control circuit 122. Accordingly, even before the spray-painting working by the robot structure to the workpiece 51 of number "k" terminates, the operator can manipulate the ten-key 103 for selecting another program number corresponding to the workpiece 51 to be subjected next to spray-painting, and this number is registered in the FIFO register 121, similarly as in the preceding case.

In the case where the operator knows the painting order beforehand, he manipulates the ten-key 103 on the key board post 101 so that numbers of predetermined programs are preset or registered in the FIFO register 121, in the order corresponding to said painting order. Every time when the detection switch 55 detects the workpieces 55 being conveyed successively, the FIFO register 121 sends out the number being registered in the order of the above described registering order, that is, in a manner of first in and first out. As a result of it, programs are successively read out from the magnetic disc 67 in the above registering order, whereby the spray-painting is carried out automatically to the workpieces 51 being conveyed successively.

Moreover, the industrial robot of the present invention can be constructed as a welding apparatus or a wrench device in the assembly line, in addition to the above described spray-painting apparatus.

Further, the workpiece conveying means is not limited to the overhead type chain conveyor 52, the workpiece 51 may be conveyed by trucks running along the track.

Furthermore, the detection switch 55 for detecting the workpiece is not limited to the mechanical type of the present embodiment, but may be of photoelectric type.

Furthermore, in the above described embodiment, the pressurized oil is utilized for actuating the cylinders 23, 26, and 28, and the rotary actuators 30 and 31. However, this invention is not limited to this, the pressurized air may be used instead of the pressurized oil, and further, the cylinder and the actuator may be organized so as to be driven electrically. The position detector 76 is not limitted to the potentiometer, but, instead of this, a resolver, a rotary encoder, or a differential transformer may be used. As a recording medium, a magnetic tape, a memory core, a magnetic drum, or a semi-conductor memory may be used instead of the magnetic disc 67.

Further, this invention is not limited to these embodiments but various variations and modifications may be made without departing from the scope of the invention.

What is claimed is:

1. An industrial robot comprising: a robot structure having a movable part; driving means for driving said movable part; detection means for detecting a substantial displacement of said movable part and for generating a position detection signal; memory means for memorizing the signal from said detection means and reading out the signal thus memorized, said memory means being capable of a plurality of operation programs corresponding to kinds of workpieces; control means adapted to control a memorizing operation and read out operation of said memory means and control of said driving means responsive to the signal read out from the memory means; program number selection means for selecting a pre-determined program connected to the control means, whereby a program corresponding to the program number thus selected by said program number selection means is read out from said memory means; workpiece conveying means for conveying a workpiece through a space in which said movable part of said robot structure moves, allowing working to said workpiece at a predetermined working place; and workpiece detection means disposed near entrance to the working place in a conveying path of said conveying means, for detecting the workpiece conveyed to the working place and to thereby send out a detection signal to said control means, said control means undergoing operation in response to the work detection signal supplied thereto.

2. An industrial robot as claimed in claim 1 further comprising: teaching mode operation means, said operation means is manipulated to assume a teaching operation mode and applies a teaching mode signal to said control means; said control means, responsive to said teaching mode signal, produces a signal to cause said memory means to memorize and signal for controlling said driving means to be no-load with respect to said movable part; playback mode manipulation means, said manipulation means is manipulated so as to assume a playback operation mode and applies a playback mode signal to said control means; said control means responsive to said playback signal, produces a signal to cause said memory means to perform a read out operation and a signal for causing said driving means to become operational, and said control means includes a coincidence circuit for making coincidence between the workpiece detection signal from the workpiece detection means and the teaching mode signal from said teaching mode operation means or the playback mode signal from said playback mode operation means; said control means being adapted to control said memory means in the teaching mode, to initiate the memorizing operation, whereupon the teaching mode signal coincides with the workpiece detection signal, and, in the playback mode initiates a read out operation whereupon the playback mode signal coincides with the workpiece detection signal.

3. An industrial robot as claimed in claim 1 which further comprises: conveying speed detection means comprising a disc having slits provided in a mechanism for driving said conveying means, and a photo-coupler for generating digital signals in response to rotations of said disc, said digital signals being used as clock signals for both writing in and reading out for said memory means.

4. An industrial robot as claimed in claim 1, in which said program selection means is provided remote from said control means as a separate means, and includes transfer means for transferring the program number selected to said control means.

* * * * *